(12) United States Patent
Jeter, Jr. et al.

(10) Patent No.: US 7,290,105 B1
(45) Date of Patent: Oct. 30, 2007

(54) ZERO OVERHEAD RESOURCE LOCKS WITH ATTRIBUTES

(75) Inventors: Robert E. Jeter, Jr., Morrisville, NC (US); Kenneth H. Potter, Raleigh, NC (US); Darren Kerr, Palo Alto, CA (US); John W. Marshall, Cary, NC (US); Manish Changela, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 10/320,120

(22) Filed: Dec. 16, 2002

(51) Int. Cl.
 *G06F 12/00* (2006.01)
(52) U.S. Cl. ...................... 711/163; 711/150
(58) Field of Classification Search ................ 711/163, 711/150, 159, 165
 See application file for complete search history.

(56) References Cited

U.S. PATENT DOCUMENTS

| | | | | |
|---|---|---|---|---|
| 5,175,837 A * | 12/1992 | Arnold et al. | ............... | 711/152 |
| 5,226,143 A * | 7/1993 | Baird et al. | .................. | 711/145 |
| 5,490,270 A * | 2/1996 | Devarakonda et al. | ...... | 707/201 |
| 5,553,240 A * | 9/1996 | Madduri | ..................... | 709/225 |
| 5,613,139 A * | 3/1997 | Brady | ........................ | 710/200 |
| 5,678,026 A * | 10/1997 | Vartti et al. | .................. | 711/152 |
| 5,692,178 A * | 11/1997 | Shaughnessy | .................. | 707/8 |
| 5,734,909 A * | 3/1998 | Bennett | ....................... | 710/200 |
| 5,737,611 A * | 4/1998 | Vicik | ......................... | 710/200 |
| 5,801,696 A * | 9/1998 | Roberts | ....................... | 715/781 |
| 5,964,835 A * | 10/1999 | Fowler et al. | ............... | 709/216 |
| 5,991,819 A * | 11/1999 | Young | ........................ | 709/253 |
| 6,026,464 A | 2/2000 | Cohen | | |
| 6,044,478 A * | 3/2000 | Green | ......................... | 714/42 |
| 6,078,997 A * | 6/2000 | Young et al. | ............... | 711/144 |
| 6,119,215 A | 9/2000 | Key et al. | | |
| 6,178,429 B1 | 1/2001 | Cherf | | |
| 6,212,608 B1 * | 4/2001 | Bak | ........................... | 711/152 |
| 6,272,621 B1 | 8/2001 | Key et al. | | |
| 6,405,322 B1 * | 6/2002 | Gaither et al. | .................. | 714/5 |
| 2002/0078119 A1 * | 6/2002 | Brenner et al. | ............. | 709/102 |
| 2002/0188605 A1 * | 12/2002 | Adya et al. | ..................... | 707/4 |
| 2003/0097531 A1 * | 5/2003 | Arimilli et al. | ............. | 711/146 |

OTHER PUBLICATIONS

U.S. Appl. No. 10/320,162, filed Dec. 16, 2002; Robert E. Jeter, Jr. et al.

* cited by examiner

*Primary Examiner*—Matthew Kim
*Assistant Examiner*—Sheng-Jen Tsai
(74) *Attorney, Agent, or Firm*—Cesari and McKenna LLP

(57) ABSTRACT

A technique efficiently accesses locks associated with resources in a computer system. A processor accesses (e.g., acquires or releases) a lock by specifying and issuing a request to a resource controller, the request containing attribute and resource location information associated with the lock. In response, the resource controller applies the information contained in the request to an outstanding lock data structure to determine if the request should be blocked, blocked as a pending writer, allowed or an error condition. If the request is blocked, it remains blocked until the outstanding lock blocking the request is released. If the request is allowed, operations associated with the request are performed.

33 Claims, 17 Drawing Sheets

L1:

| | | | |
|---|---|---|---|
| 104 — | TST | R1, (R2) | #ATTEMPT TO GET LOCK |
| 110 — | BEQ | R1, 0, L1 | #IF NOT ATOMIC TRY AGAIN |
| 112 — | NOP | | #BRANCH DELAY SLOT |

MAIN:

| | | | |
|---|---|---|---|
| 114 — | LD | R3, (R4) | #READ QUEUE HEAD, LEN |

⋮

| | | | |
|---|---|---|---|
| 116 — | ST | R5, (R4) | #STORE UPDATED QUEUE HEAD, LEN |
| 118 — | ST | R0, (R2) | #CLEAR LOCK, EXIT CRITICAL SECTION |

FIG. 1

(PRIOR ART)

606 — MOV   R1, M0    #SET M0 TO ACQUIRE MEMORY LOCK
608 — MOV   R2, M1    #SET M1 TO RELEASE MEMORY LOCK

MAIN:

614 — LD.M0  R3, (R4)   #READ QUEUE HEAD, LEN
                        #ENQUEUE NEW ELEMENT
         ⋮

618 — ST.M1  R5, (R4)   #STORE UPDATED QUEUE HEAD, LEN

| LOCK OPERATION 740 | LOCK SIZE 760 |

FIG. 7

ZERO OVERHEAD RESOURCE LOCKS WITH ATTRIBUTES

BACKGROUND OF THE INVENTION

1. Field of the Invention

The present invention relates to computer systems and, more specifically, to locking mechanisms associated with controlling access to resources in computer systems.

2. Background Information

Computer architecture generally defines the functional operation, including the flow of information and control, among individual hardware units of a computer. One such hardware unit is a processor or processing engine, which contains arithmetic and logic processing circuits organized as a set of data paths. In some implementations, the data path circuits may be configured as a central processing unit (CPU) having operations that are defined by a set of instructions. The instructions are typically stored in an instruction memory and specify a set of hardware functions that are available on the CPU.

A high-performance computer system may be realized by using a number of identical CPUs or processors to perform certain tasks in parallel. For a purely parallel multiprocessor architecture, each processor may have shared or private access to data, such as program instructions (e.g., algorithms), stored in a memory coupled to the processors. Access to an external memory is generally handled by a memory controller, which accepts requests from the various processors and processes them in an order that often is controlled by arbitration logic contained in the memory controller. Moreover, certain complex multiprocessor systems may employ many memory controllers where each controller is attached to a separate external memory subsystem.

One place where a parallel, multiprocessor architecture can be advantageously employed involves the area of data communications and, in particular, the processing engine for an intermediate network station or node. The intermediate network node interconnects communication links and subnetworks of a computer network to enable the exchange of data between two or more software entities executing on hardware platforms, such as end nodes. The nodes typically communicate by exchanging discrete packets or frames of data according to predefined protocols, such as the Transmission Control Protocol/Internet Protocol (TCP/IP) or the Internetwork Packet Exchange (IPX) protocol. Here, the processing engine may be arranged as a systolic array comprising identical processing elements or processors, where each processor in the array performs a fixed amount of work on the packet data within a fixed amount of time, by executing a distinct set of instructions on the data, before passing the data to the next processing element in the array. To further maximize throughput, the processor arrays may be replicated such that multiple processors execute the same set of instructions in parallel on different packets or frames of data and access the same shared resources, such as memory.

When two processors in a multiprocessor system vie for access to a single shared resource often a lock is employed that allows for orderly access to the shared resource. In this context, the lock is an abstraction representing permission to access the resource. For example, the lock may be configured to ensure that only one processor accesses a segment of memory at any given time. Here, each segment of the memory may have a lock (e.g., a memory bit) associated with it and whenever a processor requires access to the segment, it determines whether the lock is "locked" or "unlocked." A locked status indicates that another processor is currently accessing that segment of the memory. Conversely, an unlocked status indicates that the segment is available for access. Thus, when a processor attempts to access a memory segment, it simply tests the lock associated with the segment to determine whether that segment is currently being accessed. If not, the testing processor acquires the lock to exclude other processors from accessing the segment.

One previous technique often used by processors to access a lock involves a code loop where the loop repeats until the lock is acquired. FIG. 1 is a listing of a typical sequence of instructions illustrating this technique. In this sequence, the lock is a bit at a memory location referenced (pointed to) by the contents of register R2. The instructions at lines 104 and 110 are executed to access (e.g., acquire) the lock, lines 114 and 116 comprise a "critical-code section" that manipulates a critical data structure contained in a memory location associated with the lock, and the instruction at line 118 releases the lock. A critical-code section is a section of code that must be executed atomically, i.e., without interference from other sources, to preserve data integrity, hardware integrity, and access serialization.

Specifically, at line 104 the processor attempts to acquire the lock and sets the value in register R1 to indicate whether or not the lock was acquired. At line 110, a conditional-branch instruction tests the value in register R1 to determine if the lock was acquired. The delay-slot instruction at line 112 is then executed. (The example assumes a delay-slot architecture, in which the instruction located immediately after a branch instruction is executed independently of the branch test's result.) If the lock was not acquired, the branch at line 110 is taken and execution then resumes at the top of the loop at line 104. Otherwise, execution resumes at line 114 where the processor performs the critical-code section, as indicated at lines 114 through 116, and then releases the lock, as indicated at line 118.

One drawback with above-described technique is that the order in which the processors attempt to acquire the lock is not preserved. Thus, it is possible to indefinitely prevent ("starve") a processor from acquiring the lock. For example, assume processors A, B, and C execute the above-described code loop to acquire a lock. Further, assume processor A acquires the lock. Next, processor B attempts to acquire the lock but fails as the lock is being held by processor A. Processor A then releases the lock and shortly thereafter, processor C acquires it. Processor B, again, attempts to acquire the lock but fails. Next processor C releases the lock and shortly thereafter, processor A acquires it. Again, when processor B attempts to acquire lock it will fail because the lock is now held by processor A, and so on.

Another drawback with the above-described technique is that the processor continually executes the code loop until the lock is acquired. Thus, the processor is unable to perform other useful work, as it is busy acquiring the lock. Moreover, valuable memory bandwidth is wasted because an instruction that accesses memory, i.e., instruction 104, is executed in an attempt to acquire the lock even though the location may already be locked.

SUMMARY OF THE INVENTION

The present invention relates to a technique for efficiently accessing locks associated with resources in a computer system. According to the technique, a processor accesses (e.g., acquires or releases) a lock simply by specifying and issuing a request to a resource controller, the request containing attribute and resource information associated with the lock. In response, the resource controller applies the information contained in the request to an outstanding lock data structure to determine if the request should be blocked, blocked as a pending writer, allowed or an error condition. If the request is allowed, a lock operation contained in the information is performed.

In the illustrative embodiment, the processor accesses the lock by generating and issuing a request to a memory controller. The request illustratively comprises information such as a memory operation, a memory address, a lock request, a lock operation, and a lock size. The memory controller applies the information to the outstanding lock data structure and, if the request is allowed, the lock and memory operations contained in the request are performed. However, if the request is blocked, it remains blocked until the outstanding lock blocking the request is released. Advantageously, the inventive technique is an improvement over prior techniques in that it obviates having to execute a code loop to acquire a lock.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 1 is a listing of a sequence of processor instructions that involves the use of locks;

FIG. 6 is an example listing of a code fragment of exemplary instructions that illustrate a technique for acquiring and releasing a lock in accordance with the inventive technique;

FIG. 7 is a schematic block diagram of a memory-lock register that can be advantageously used with the present invention;

DETAILED DESCRIPTION OF AN ILLUSTRATIVE EMBODIMENT

Figure 2:
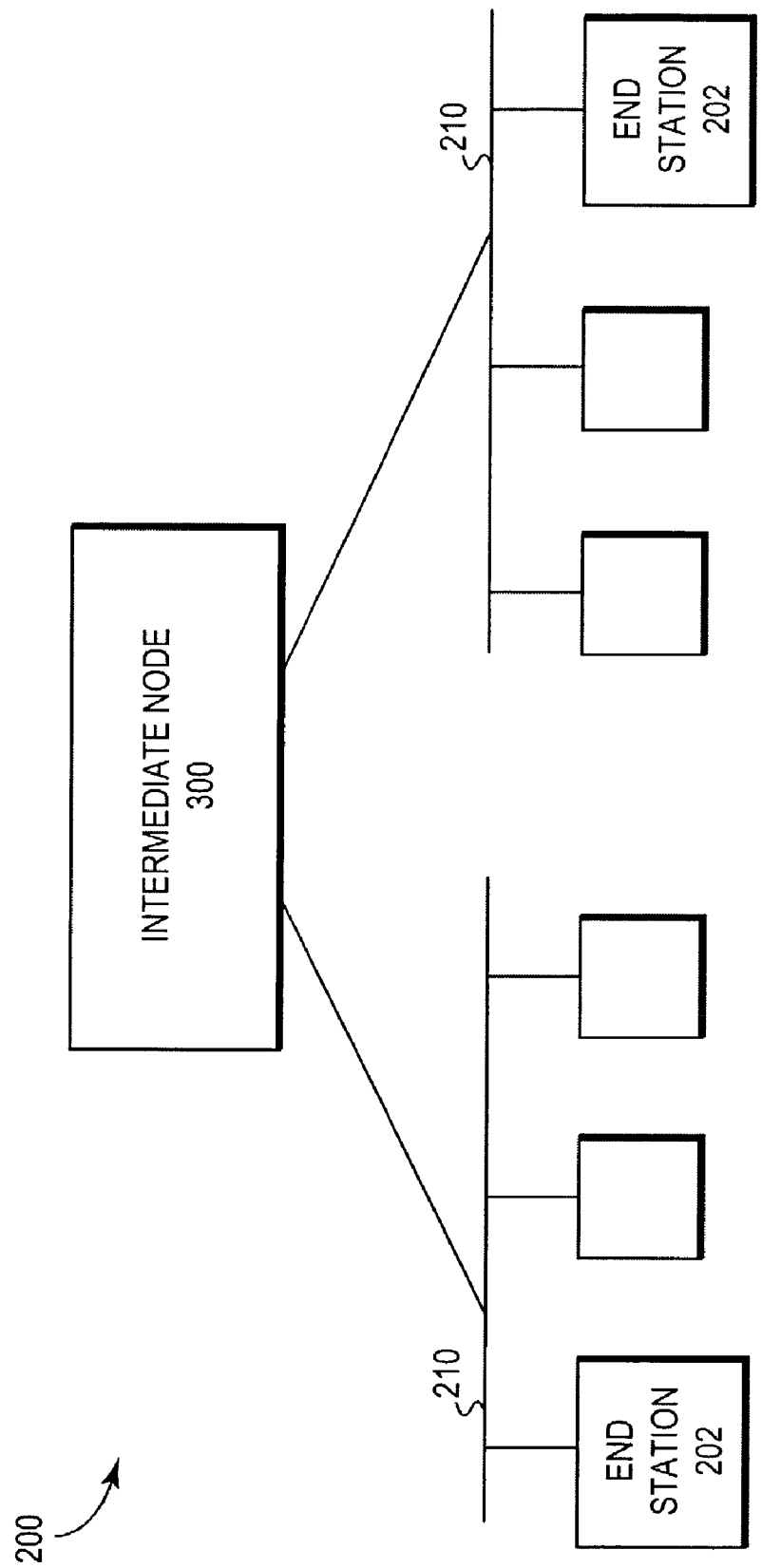
FIG. 2 is a schematic block diagram of a computer network comprising a collection of interconnected communication media and subnetworks attached to a plurality of stations that may advantageously be used with the present invention.

FIG. 2 is a block diagram of a computer network 200 comprising a collection of interconnected communication media and subnetworks attached to a plurality of nodes. The nodes are typically computers comprising end stations 202 and intermediate node 300. The intermediate node 300 may be a router or a network switch, whereas the end stations or nodes 202 may include personal computers or workstations. The subnetworks generally comprise local area networks (LANs) 210, although the invention may work advantageously with other communication media configurations, such as point-to-point network links. Communication among the nodes of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internetwork Packet Exchange (IPX), AppleTalk or DECNet protocols.

Figure 3:
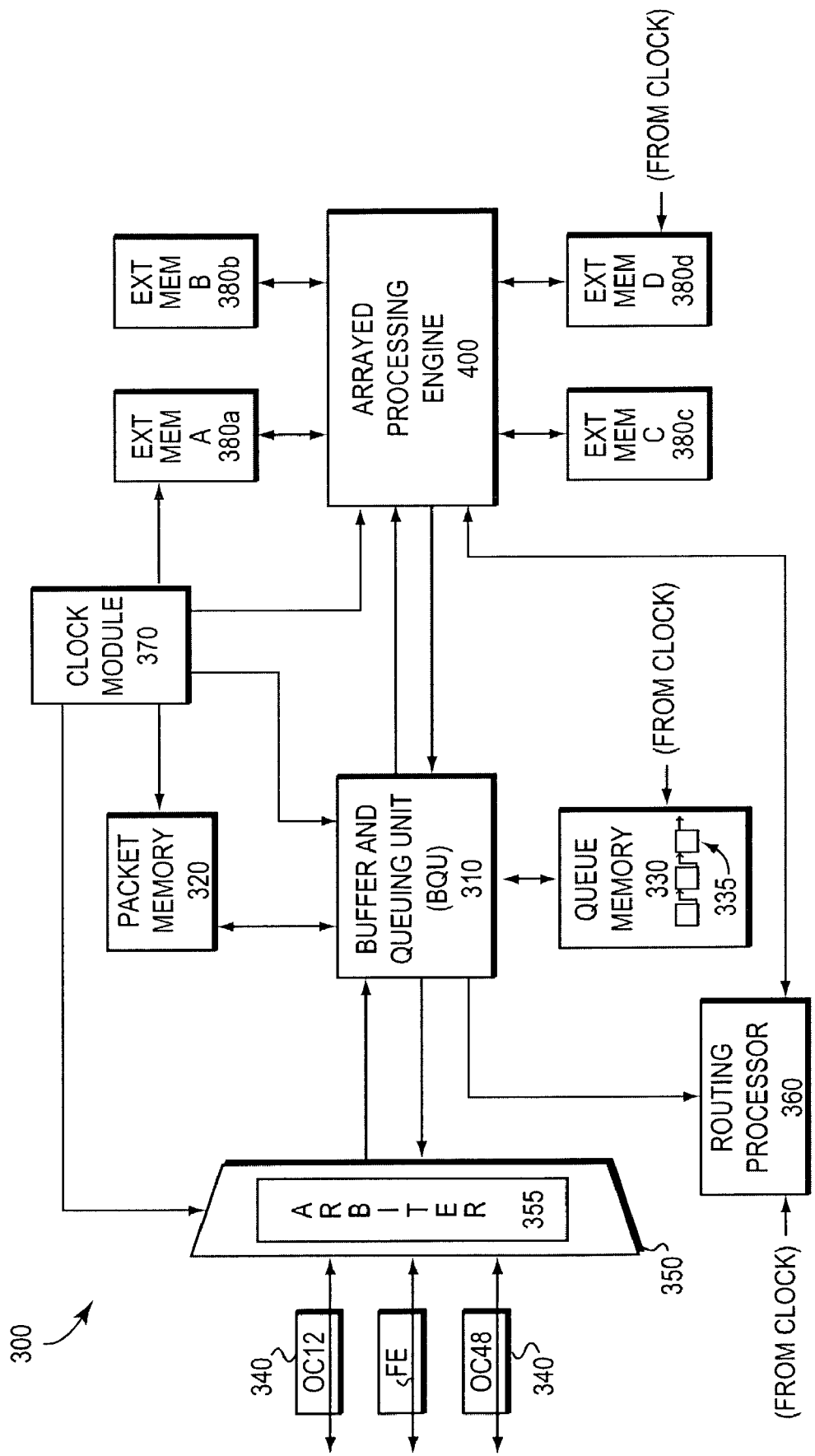
FIG. 3 is a schematic block diagram of an intermediate node, such as a network switch, having an arrayed processing engine coupled to a memory partitioned into a plurality of external memory resources that may advantageously be used with the present invention.

FIG. 3 is a schematic block diagram of intermediate node 300 that, in the illustrative embodiment, is a network switch. The switch 300 generally performs layer 2 processing functions, such as "cut-through" operations wherein an entire frame does not have to be stored before transfer to a destination; in addition, switch 300 may implement layer 3 forwarding operations. It should be noted, however, that the switch 300 might also be configured as a router to perform layer 3 route processing. A feature of the architecture described herein is the ability to program the node for execution of layer 2, layer 3, or higher-layer operations. Operation of the switch will be described with respect to IP switching of packets, although the switch may be programmed for other applications, such as data encryption.

The switch 300 comprises a plurality of interconnected components including an arrayed processing engine 400, various memories, queuing logic 310, and network port interface cards 340. Operations of these components are preferably synchronously controlled by a clock module 370 although the arrayed elements of the processing engine is may be operatively configured to function asynchronously. In the illustrative embodiment, the clock module 370 generates clock signals at a frequency of, e.g., 200 megahertz (i.e., 5 nanosecond clock cycles), and globally distributes them via clock lines to the components of the switch.

The memories generally comprise random access memory storage locations addressable by the processing engine and logic for storing software programs and data structures accessed by the components. An operating system, portions of which are typically resident in memory and executed by the arrayed processing engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 400 is coupled to a memory partitioned into a plurality of external memory (Ext Mem) resources 380 which are preferably organized as one or more banks and implemented using fast-cycle-random-access-memory (FCRAM) devices, although other devices, such as reduced-latency-dynamic-random-access-memory (RLDRAM) devices, could be used. A buffer and queuing unit (BQU) 310 is connected to a packet memory 320 for storing packets and a queue memory 330 for storing network layer headers of the packets on data structures, such as linked lists, organized as queues 335. The BQU 310 further comprises data interface circuitry for interconnecting the processing engine with a plurality of line cards 340 via a selector circuit 350 having an arbiter 355. The line cards 340 may comprise, e.g., OC12, OC48 and Fast Ethernet (FE) ports, each of which includes conventional interface circuitry that may incorporate the signal, electrical and mechanical characteristics, and interchange circuits, needed to interface with the physical media and protocols running over that media. A typical configuration of the switch may include many input/output channels on these interfaces, each of which is associated with one queue 335 in the queue memory 330. The processing engine 400 generally functions as a switching processor that modifies packets and/or headers as the BQU 310 implements queuing operations.

A routing processor 360 executes conventional routing protocols for communication directly with the processing engine 400. The routing protocols generally comprise topological information exchanges between intermediate nodes to determine preferred paths through the network based on, e.g., destination IP addresses. These protocols provide information used by the processor 360 to create and maintain routing tables. The tables are loaded into the external partitioned memories 380 as forwarding information base (FIB) tables used by the processing engine to perform forwarding operations. When processing a header in accordance with IP switching, the engine 400 determines where to send the packet by indexing into the FIB using an IP address of the header. Execution of the forwarding operations results in destination media access control (MAC) addresses of the headers being rewritten by the processing engine to identify output ports for the packets.

Figure 4:
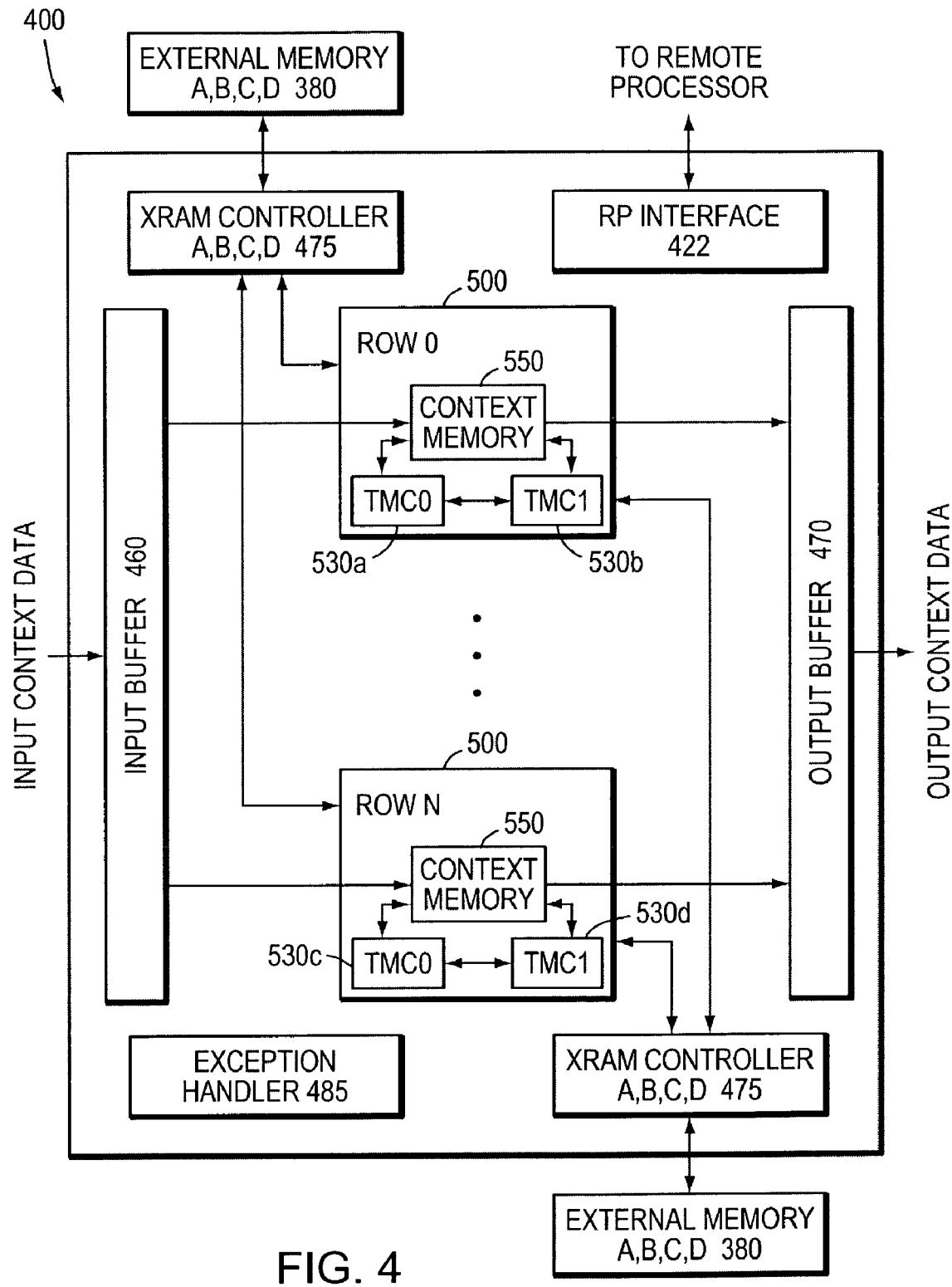
FIG. 4 is a schematic block diagram of the arrayed processing engine comprising a symmetric multiprocessor system configured as a multi-dimensioned systolic array.

FIG. 4 is a schematic block diagram of the programmable processing engine 400 which comprises an array of processors embedded between input and output header buffers with a plurality of interfaces from the array to partitions of an external memory. The external memory stores non-transient data organized within data structures for use in processing the transient data. The non-transient data typically includes "table" data contained in forwarding and routing tables, statistics, access filters, encryption keys, and/or queuing information. Transient data (e.g., packet/frame data) enters and exits the engine via 64-bit input and output data interfaces of the BQU 310. A remote processor (RP) interface 422 provides information, such as instructions and data, from a remote processor (not shown) to the processors and buffers over a maintenance bus having multiplexed address/data lines. An exception handler unit 485 detects exception conditions generated by, inter alia, external-random-access-memory (XRAM) controllers 475, and reports the conditions to the processors 530 and the remote processor (not shown).

The processing engine 400 may comprise a symmetric multiprocessor system having a plurality of processors (TMCs) 530. Each processor 530 is illustratively a pipelined processor that includes, inter alia, a plurality of arithmetic logic units (ALUs) and a register file having a plurality of general purpose registers that store intermediate result information processed by the ALUs. The processors may be arrayed into multiple rows and columns, and further configured as a multi-dimensional systolic array. In the illustrative embodiment, the processors are arrayed as eight (8) rows and two (2) columns in an 8×2 arrayed configuration that is embedded between an input buffer 460 and an output buffer 470. However, it should be noted that other arrangements, such as 4×4 or 8×1 arrayed configurations, might be advantageously used with the present invention. As noted herein, a single processor supporting multiple threads of execution can take advantage of the invention. Also, as noted herein, a system comprising a plurality of symmetrical or asymmetrical processors operating asynchronously can also take advantage of the invention.

The processors of each row are configured as a "pipeline" to sequentially execute operations on the transient data loaded by the input buffer 460, whereas the processors of each column operate in parallel to perform substantially the same operation on the transient data, but with a shifted phase. Each phase comprises a predetermined period of cycles, e.g., 128 cycles. Sequencing circuitry of the input buffer 460 controls the processors of each pipeline by ensuring that each processor completes processing of current transient data before loading new transient data into the pipeline at a new phase. In general, a new phase of processing is started, i.e., a context switch is performed, when all of the processors finish processing their current context and new, incoming context is completely received by the input buffer.

Figure 5:
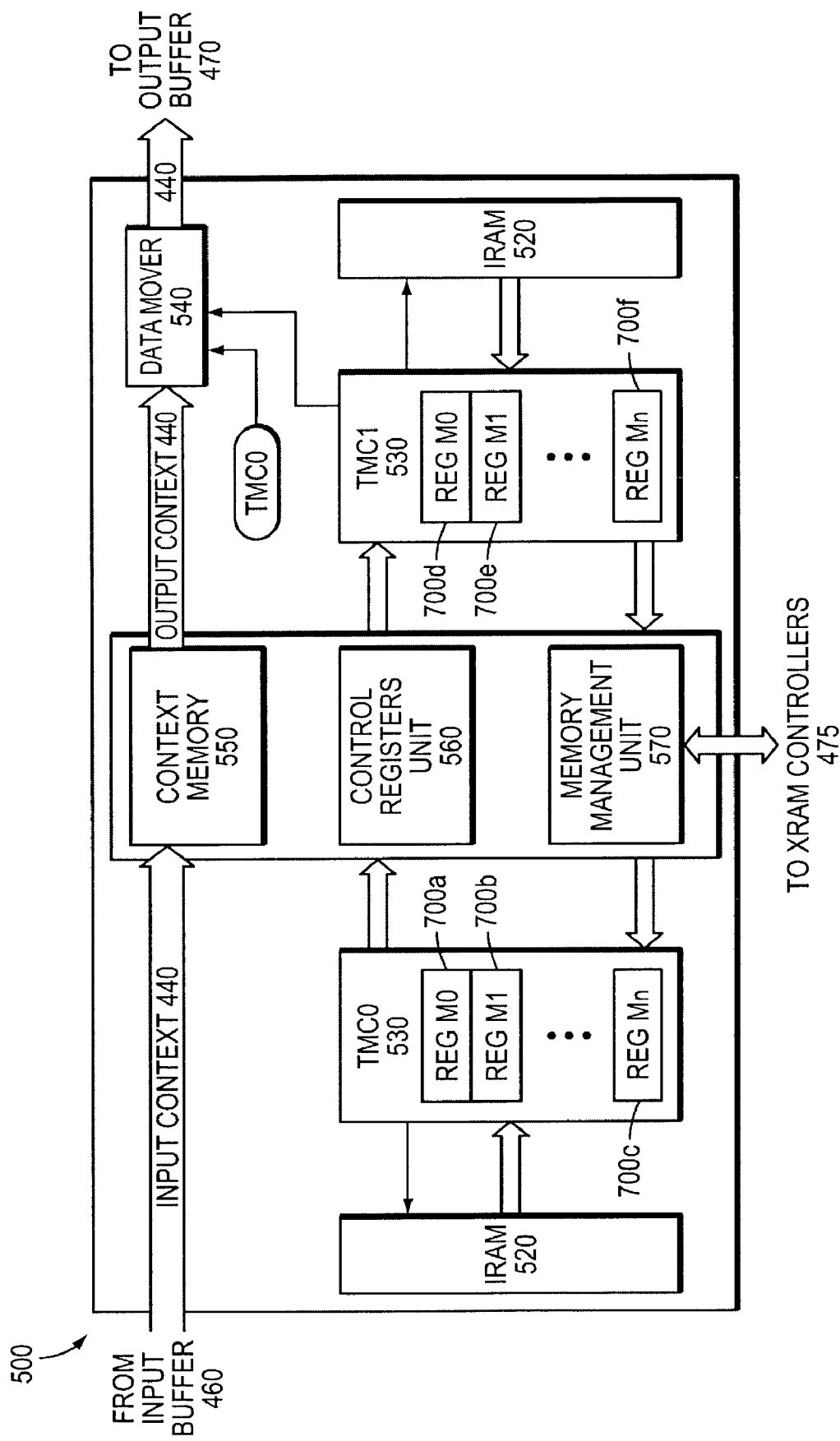
FIG. 5 is a schematic block diagram of a processor cluster of the arrayed processing engine.

The processors of each row are connected to a context memory 550 and are organized as a cluster 500. FIG. 5 is a schematic block diagram of a cluster 500. Each processor 530 contains one or more memory-lock registers 700 configured to hold information associated with locks. Moreover, each processor 530 of the cluster is coupled to an instruction memory (IRAM) 520 configured to store instructions for execution by the processor 530, a control registers unit 560, the context memory 550, and a memory management unit (MMU) circuit 570, the latter configured to provide, inter alia, processor access to shared external memory 380. Each external memory 380 generally comprises a plurality of (e.g., 8) banks or resources that connect to the cluster via an XRAM controller 475. In the illustrative embodiment, there are four XRAM controllers, i.e., XRAM controller A, B, C, and D, one for each external memory 380.

The XRAM controller 475 (FIG. 4) enables the processors of a cluster to perform various memory operations, including storing and retrieving information to and from memory locations of the external memories 380. The shared external memory 380 accessed by the processors may comprise data structures, such as tables, that are updated and accessed by the processors of each column. The XRAM controller 475 is illustratively embodied as a 200 MHz external memory interface coupled to a column of processors. Therefore, the XRAM controller 475 is configured to enable shared columned processor access to the non-transient data stored in the external memory.

As noted, the processors 530 of each cluster 500 execute operations on transient data loaded into the context memory 550 by the input buffer 460, whereas the processors of each column operate in parallel to perform substantially the same operation on the transient data, but with a shifted phase. Transient "context" data (e.g., packet/frame data) are passed between the input and output buffers of the engine 400 over a data path channel 440 provided by a data mover circuit 540 coupled to the processor. The context data flowing through the cluster 500 is stored in the context memory 550 along with pointers that reference data structures and tables stored in, e.g., external memory 380, for use by the processor 530.

The present invention relates to a novel technique for efficiently accessing locks in a computer system. Briefly, a processor accesses (e.g., acquires or releases) a lock by specifying and issuing a request to a resource controller, the request containing attribute and resource location information associated with the lock. If the request is allowed, the operations contained in the request are performed. However, if the request is blocked, it remains blocked until the outstanding lock blocking the request is released. Advantageously, the inventive technique is an improvement over prior techniques in that it obviates having to execute a code loop in order to acquire a lock.

Assume processor 530a executes an algorithm that involves acquiring a lock associated with a resource, such as a queue. The algorithm further involves placing an element on the queue and then releasing the lock. FIG. 6 is a listing of exemplary instructions that processor 530a might execute to perform this algorithm in accordance with the inventive technique.

Figure 7:
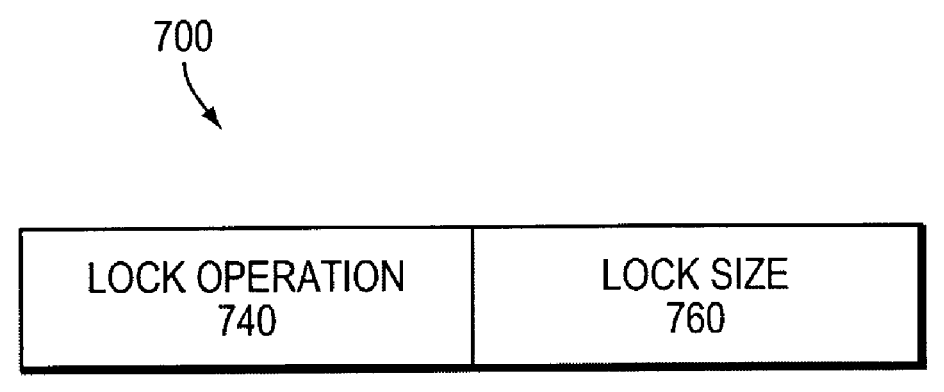

The instructions at lines 606 and 608 direct processor 530a to move attribute information, including lock operation and size values, associated with acquiring and releasing the lock into memory registers "M0" 700a and "M1" 700b, respectively. FIG. 7 is a schematic block diagram of a memory-lock register 700 that can be used with the present invention. Register 700 comprises a lock operation field 740 that holds a lock operation value that represents an operation used to access the lock, and a lock size field 760 that holds a lock size value that represents the size of the memory segment associated with the lock. Table 1 lists lock operations and their associated bit encoding that can be used with the present invention.

TABLE 1

| Encoding | Lock Operation |
| --- | --- |
| 000 | Lock Clear |
| 001 | Get Exclusive |
| 010 | Get Shared Reader |
| 100 | Get Exclusive Writer |

The "lock clear" operation clears (releases) an outstanding lock, i.e., a lock that is active (outstanding) for a particular memory segment, whereas the "get exclusive," "get shared reader," and "get exclusive writer" operations acquire a lock. Specifically, the "get exclusive" operation acquires an exclusive lock. An exclusive lock allows requests that specify an address contained in the memory segment associated with the lock and that are issued by an entity, e.g., a processor, that has been granted the lock, while blocking requests from other entities that specify an address in that same memory segment. The "get shared reader" operation acquires a shared-reader lock. A shared-reader lock allows requests that specify a read memory operation at an address in the memory segment associated with the lock, and blocks certain requests that specify a write memory operation at an address in that same memory segment. The "get exclusive writer" operation acquires an exclusive-writer lock. An exclusive-writer lock allows requests that specify a read memory operation at an address contained in the memory segment associated with the lock, and blocks requests that specify a write memory operation at an address in that same memory segment and that are issued by entities other than the entity that has been granted the lock.

Figure 8A:
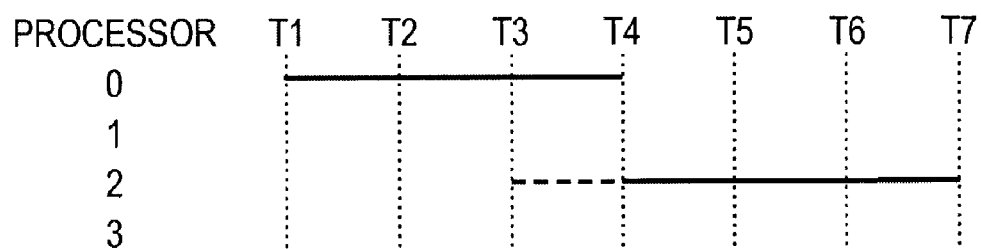
FIGS. 8A-8C are timing diagrams that illustrate the operation of various lock operations that can be advantageously used with the present invention.
Figure 8B:
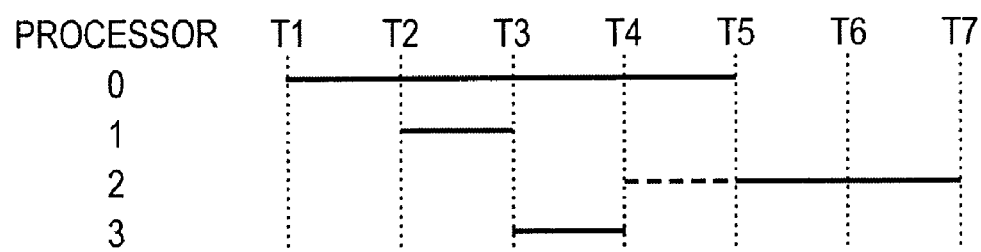
Figure 8C:
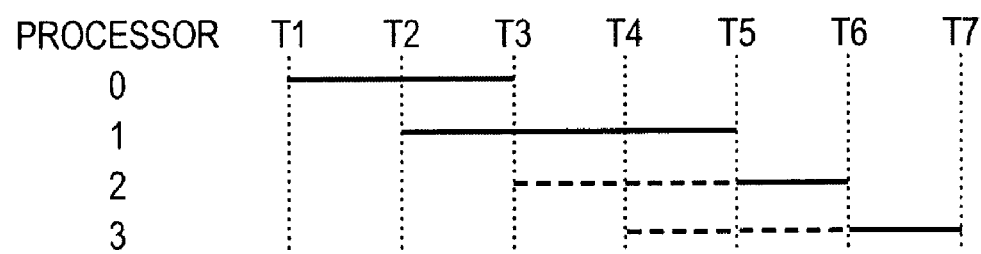

FIGS. 8A–8C are exemplary timing diagrams that illustrate the operation of the exclusive, exclusive-writer, and shared-reader locks, respectively. As used herein, a "read request" is a request that specifies a read memory operation and a "write request" is a request that specifies a write memory operation. Referring to FIG. 8A, at time T1 processor 0 acquires an exclusive lock using the "get exclusive" lock operation and holds the lock until time T4 when it is released (e.g., cleared using the "lock clear" operation). At time T3, processor 2 issues a request that specifies a memory location within the memory segment controlled by the lock. Since at time T3 the exclusive lock is still held by processor 0, i.e., it is still outstanding, the request issued by processor 2 is blocked by the memory controller until time T4 when the lock is released and at which time the request issued by processor 2 is allowed. Note that processor 2 may continue to execute instructions that are not dependent upon the results of the blocked request.

Referring to FIG. 8B, at time T1 processor 0 acquires an exclusive-writer lock using the "get exclusive writer" operation and holds the lock until time T5 when it releases the lock. Meanwhile, at times T2 and T3, processors 1 and 3, respectively, issue read requests that specify an address contained in the memory segment controlled by the lock. Since the requests are read memory operations, they are allowed. At time T4, processor 2 issues a write request that specifies an address contained in the memory segment controlled by the lock. The memory controller blocks this write request, since the exclusive-writer lock is still outstanding at time T4. The write request remains blocked until the lock is released, i.e., at time T5, at which time the request is allowed.

Referring to FIG. 8C, at time T1 processor 0 acquires a shared-reader lock using the "get shared reader" operation and holds the lock until it releases the lock at time T3. At time T2, processor 1 acquires the same shared-reader lock and holds the lock until it releases the lock at time T5. Meanwhile, at time T3 processor 2 issues a write request that specifies an address within the memory segment controlled by the lock. Since the shared-reader lock is still outstanding at time T3, the write request is marked as a "pending writer" and blocked until processor 1 releases the lock at time T5. At time T4, processor 3 issues a read request that attempts to acquire the same shared-reader lock. However, since an outstanding blocked pending writer exists that is older than the read request, i.e., the write request from processor 2, the read request is blocked until the pending write request completes at time T6, at which time the read request is allowed.

Figure 9:
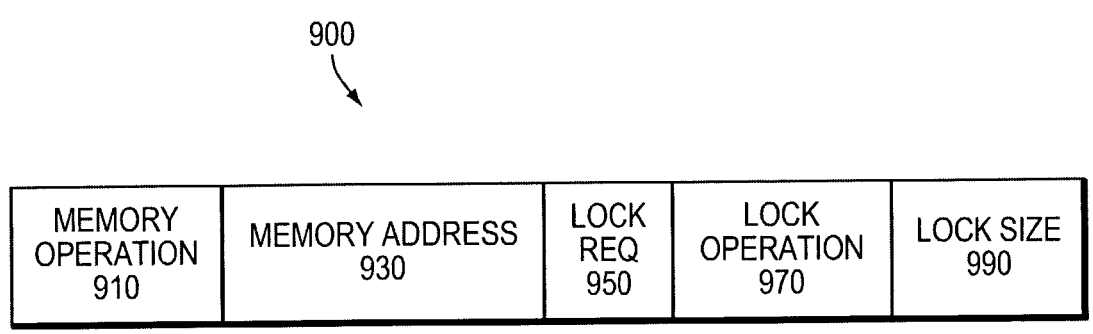
FIG. 9 is a schematic block diagram of a request that can be advantageously used with the present invention.

Referring again to FIG. 6, the instruction at line 614 directs processor 530a to acquire the lock using the attribute information contained in register M0 700a and fetch the length and the location of the head of the queue. Since the instruction at line 614 involves a lock operation, processor 530a processes instruction 614 by, inter alia, generating and issuing a request that contains information associated with the lock. FIG. 9 is a block diagram of a request 900 generated by processor 530 in accordance with the present invention. Request 900 comprises a memory operation field 910, a memory address field 930, a lock request (REQ) field 950, a lock operation field 970, and a lock size field 990. Illustratively, for purposes of accessing a lock, the memory address field 930 holds resource information and the lock operation 970 and lock size 990 fields hold attribute information. In particular, the memory operation field 910 holds a memory operation, e.g., a read, or write operation. The lock operation field 970 holds a lock operation (described above) and the lock request field 950 holds a value that indicates whether the request 900 contains a lock request, i.e., whether the lock operation field 970 contains a valid lock operation. The memory address field 930 holds a memory address associated with the lock and the lock size field 990 holds a size of a memory segment associated with the lock. Table 2 lists various size values and their associated memory segment sizes that may be used to encode field 990. Collectively, the lock size 990 and memory address 930 fields define the memory segment controlled by the lock associated with the request. In the illustrated embodiment, the memory segment is the portion of memory of the specified size 990 that includes the location indicated by the memory address 930, and is aligned in memory on a boundary equal to the size 990. In this embodiment, the starting address of the memory segment is determined by zeroing lower-order address bits of the memory address 930 based on the lock size 990.

TABLE 2

| Size value | Memory segment size (in bytes) |
|---|---|
| 0 | 4 |
| 1 | 8 |
| 2 | 16 |
| 3 | 32 |
| 4 | 64 |
| 5 | 128 |
| 6 | 256 |
| 7 | 512 |

Figure 10:
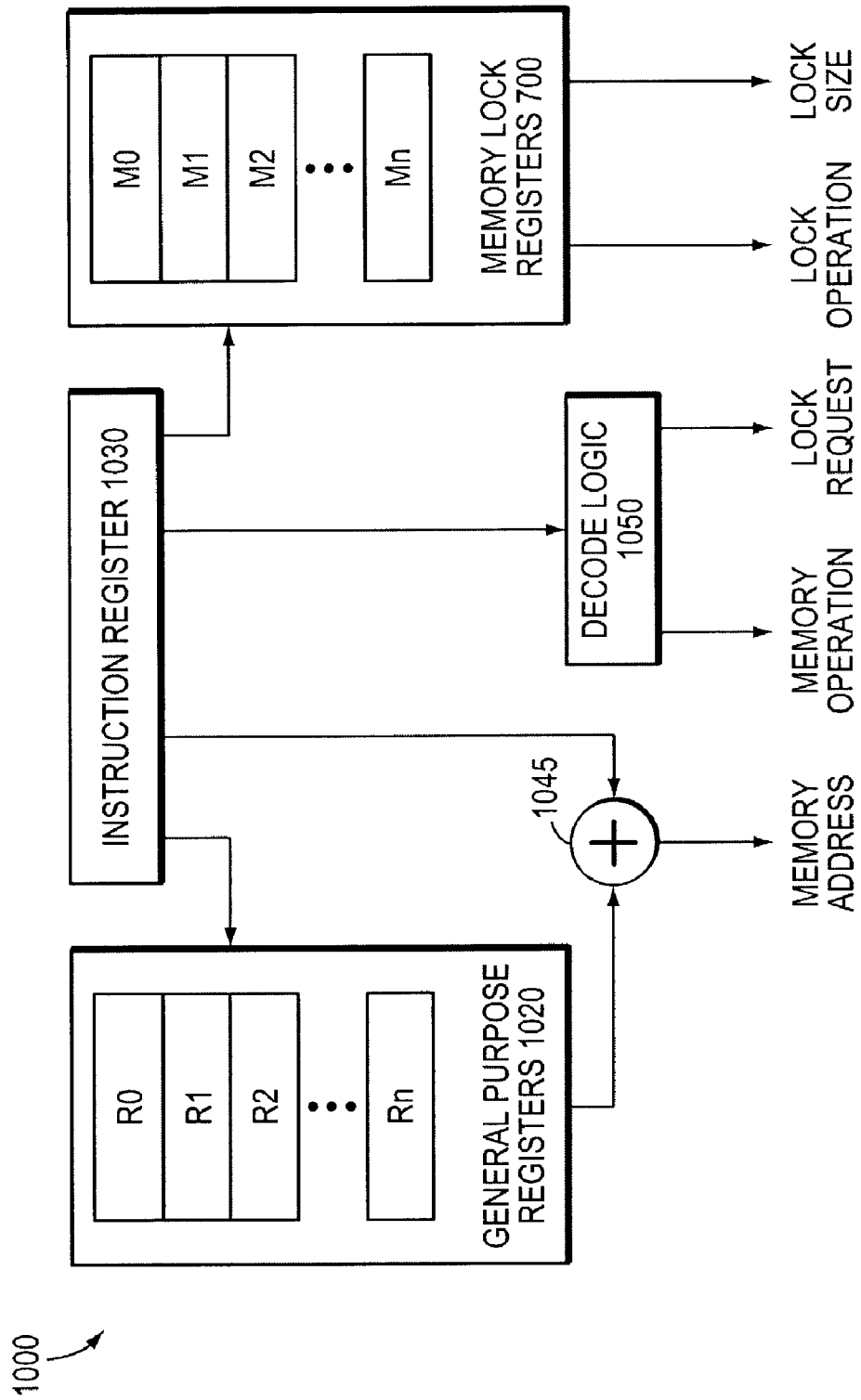
FIG. 10 is a schematic block diagram of processor logic that can be advantageously used to generate a request in accordance with the present invention.

FIG. 10 is a schematic block diagram of logic 1000 contained in processor 530 that can be used to generate a request 900 in accordance with the inventive technique. Logic 1000 comprises an instruction register 1030, one or more general-purpose registers 1020 and memory-lock registers 700, along with conventional address generator logic 1045 and decode logic 1050. The instruction register 1030 holds an instruction and generates various signals including signals that select various general-purpose and memory-lock registers. The general-purpose registers 1020 hold data values including memory addresses that, along with information contained in the instruction register 1030, are used by the address generator logic 1045 to generate a memory address. The decode logic 1050 generates a memory operation and lock request based on information contained in the instruction register.

Operationally, processor 530a generates the request 900 by placing instruction 614 into instruction register 1030 where the instruction is decoded and signals are generated including signals that select general-purpose register R4 and memory-lock register M0. The contents of the selected general-purpose register, along with address displacement information contained in the instruction register, are transferred to the address generator logic 1045. Address generator logic 1045 then generates a memory address value that is placed in memory address field 930.

The operation code (opcode) of instruction 614, i.e., "LD.M0," is transferred to the decode logic 1050, which generates the memory operation and lock request values using the opcode. Decode logic 1050 then places the generated values in the memory operation 910 and lock request 950 fields, respectively. Since instruction 614 specifies a memory-lock register, i.e., M0, logic 1000 sets the lock request field 950 to indicate that the lock operation field 970 contains a lock operation. The contents of the lock operation field 740 and lock size field 760 of selected memory-lock register M0 are used to generate values that are placed in the lock operation 970 and lock size fields 990, respectively.

Figure 11:
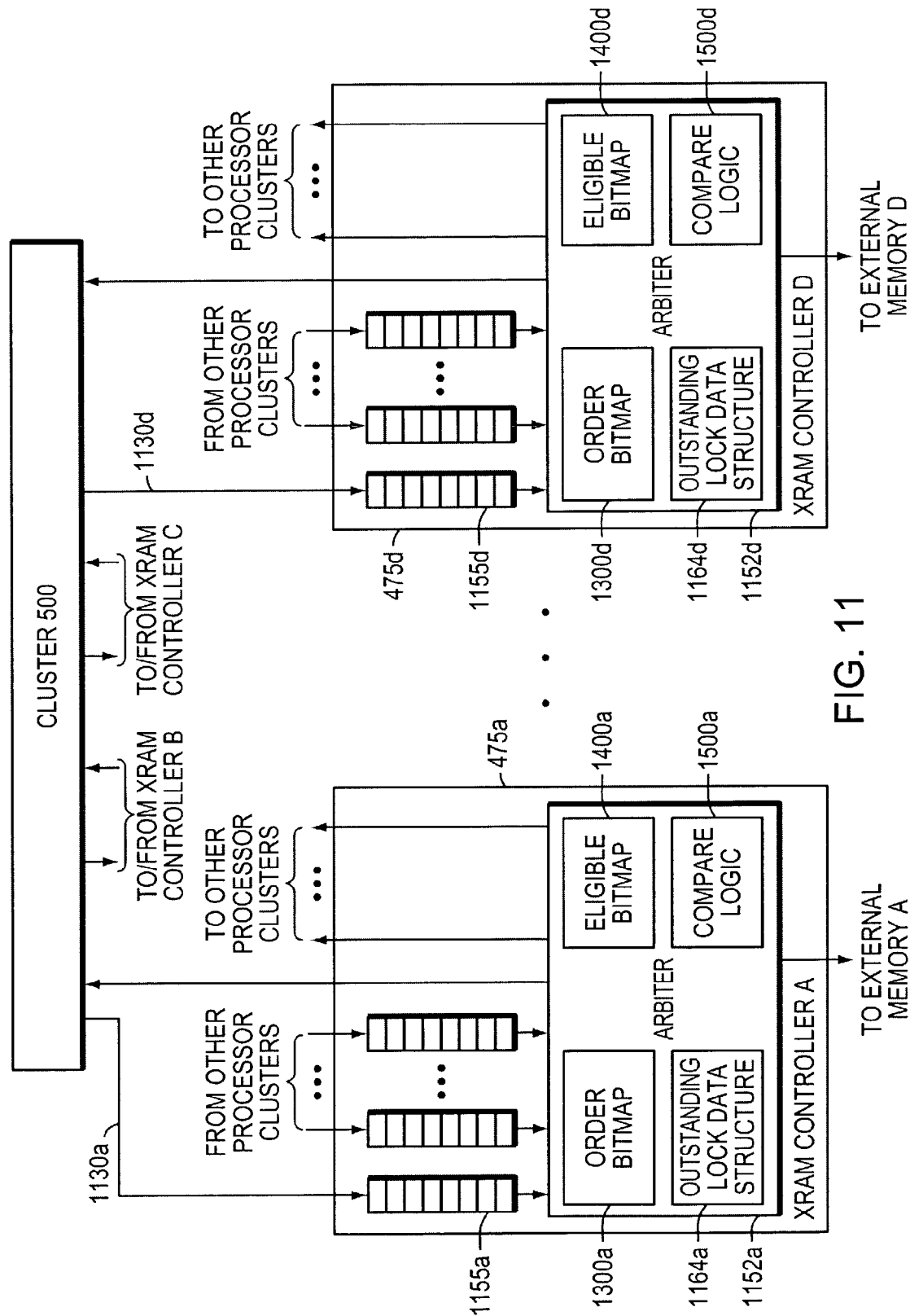
FIG. 11 is a schematic block diagram of a processor cluster coupled to a plurality of memory controllers.

In the illustrative embodiment, the processor accesses the lock by generating and issuing a request to a memory (resource) controller, such as XRAM controller 475. FIG. 11 is a schematic block diagram of a cluster 500 coupled to XRAM controllers 475 containing request queues, one of which is associated with processor 530a. Each XRAM controller 475 comprises a plurality of request queues 1155 configured to hold requests issued by the processors of clusters 500 and an arbiter 1152. Each request queue 1155 is coupled to a specific cluster 500 and configured to receive requests from the cluster via a memory-request bus 1130. For example, queue 1155a is coupled to the cluster 500 comprising processors 530a and 530b, and receives requests issued by these processors over bus 1130a. The received requests are loaded into a "bottom" (tail) of the queue. Illustratively, each queue is capable of holding up to eight requests.

The arbiter 1152 comprises logic that enables it to process requests, contained in the request queues 1155, in accordance with the inventive technique. This logic includes an order bitmap 1300 that tracks the order in which the requests reach the head of their respective queues, an outstanding lock data structure 1164 that holds information associated with outstanding (active) locks, an eligible bitmap 1400 for tracking requests that are eligible to be issued to an external memory 380, and compare logic 1500 used to determine whether a request is, inter alia, allowed or blocked.

Figure 12:
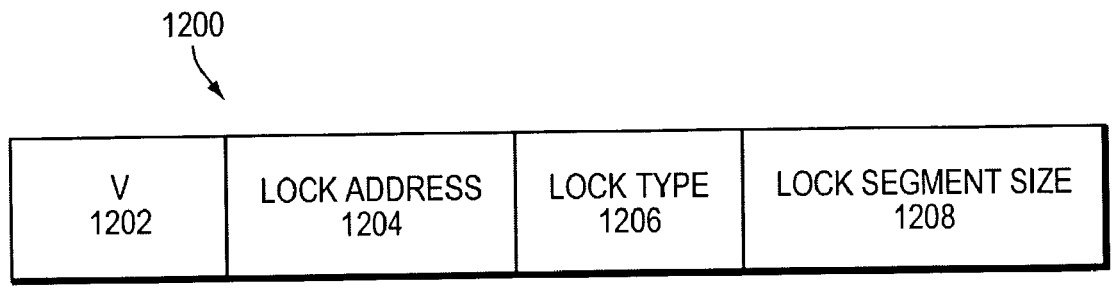
FIG. 12 is a schematic block diagram of an outstanding lock data structure entry that can be advantageously used with the present invention.

The outstanding lock data structure 1164 is illustratively organized as a table comprising one or more entries, where each entry is associated with an entity (such as a processor 530) and represents a lock held by that entity. FIG. 12 is a block diagram of an outstanding lock data structure entry 1200 that can be advantageously used with the present invention. Entry 1200 comprises a valid field 1202 that indicates whether the entry contains valid data, i.e., an "active" lock, a lock address field 1204 that holds the memory address of the lock, a lock type field 1206 that holds the type of lock, e.g., exclusive, shared reader, exclusive writer, and a lock segment size field 1208 that holds a value that defines the size of the memory segment controlled by the lock. The contents of the address field 1204 combined with the contents of the segment size field 1208 define the memory segment controlled by the outstanding lock. Preferably, the outstanding lock data structure 1164 contains "P×L" entries wherein "P" is the number of processors 530 and "L" is the number of outstanding locks allowed per processor.

Figure 13:
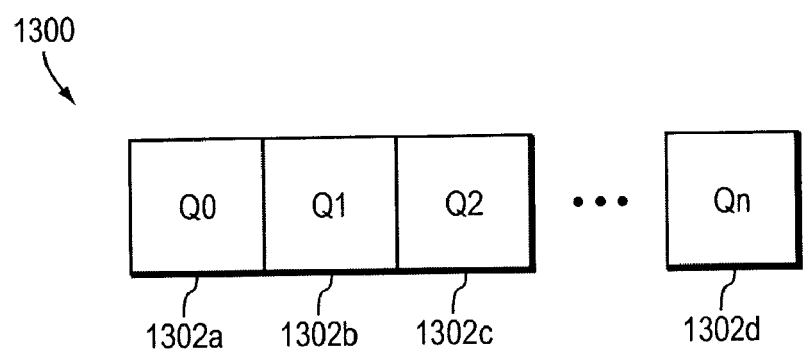
FIG. 13 is a schematic block diagram of an order bitmap that can be advantageously used with the present invention.

FIG. 13 is a block diagram illustrating an order bitmap 1300 that can be used with the present invention. In the illustrative embodiment, the arbiter 1152 maintains a separate order bitmap 1300 for each request queue. Order bitmap 1300 illustratively contains a plurality of 1-bit fields 1302, where each bit is associated with a particular request queue and indicates whether a request at the head of that queue is older than a request at the head of the request queue associated with the bitmap. In other words, the order bitmap 1300 indicates those requests that both arrived at the head of their respective queues and had been previously seen (processed) by the arbiter 1152 ahead of the current request (i.e., the request being currently processed by the arbiter), and are still outstanding (i.e., have not been issued to the external memory 380). The arbiter generates a bitmap by setting bit 1302 for the request queue associated with the current request in those order bitmaps 1300 associated with request queues that do not have an outstanding request that preceded the current request.

Figure 14:
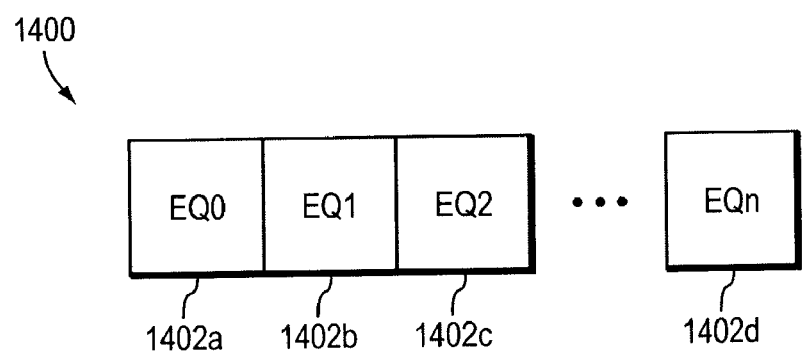
FIG. 14 is a schematic block diagram of an eligible bitmap that can be advantageously used with the present invention.

FIG. 14 is a block diagram illustrating an eligible bitmap 1400 that may be used with the present invention. Bitmap 1400 comprises one or more 1-bit fields 1402 where each field is associated with a particular processor 530 and indicates whether a request is associated with the processor is eligible to be issued to the external memory 380. A request is eligible to be issued to the external memory if the compare logic 1500 has determined that the request is allowed.

Figure 15:
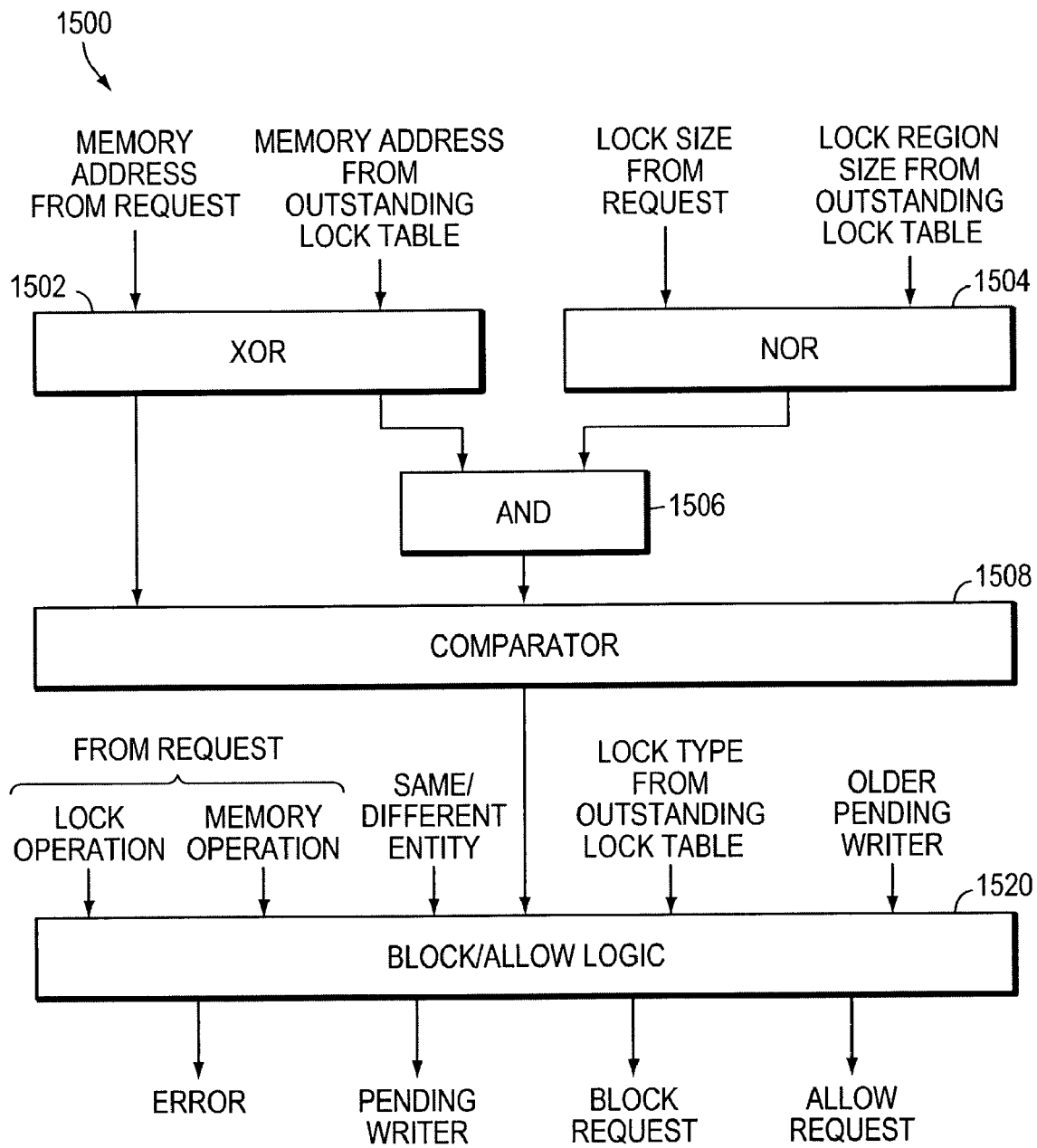
FIG. 15 is a schematic block diagram of logic that can be used to determine if a request should be blocked or allowed in accordance with the present invention.

In response to receiving the request issued by the processor, the memory controller applies the information contained in the request to the outstanding lock data structure to determine if the request should be blocked, blocked as a pending writer, allowed or an error condition. FIG. 15 is a schematic block diagram illustrating compare logic 1500 that can be used to make this determination in accordance with the present invention. Logic 1500 (i) receives information contained in outstanding lock data structure entry 1200 and request 900, (ii) determines if the request 900 is blocked, blocked as a pending writer, allowed or an error condition and (iii) generates a signal. The illustrative embodiment contains "N×M" instances of compare logic 1500 where N is the number of request queues and M is the number of entries in the outstanding lock data structure 1164, thus, enabling a current request 900 to be simultaneously compared with each valid entry 1200 in the outstanding lock data structure 1164.

Logic blocks 1502, 1504, 1506, and 1508 determine if the memory segment specified by the address 930 and size 990 of request 900 overlaps with the memory segment controlled by the outstanding lock entry 1200. Specifically, logic block 1502 performs a logical exclusive OR (XOR) operation of the address 930 in the request with the address 1204 in the outstanding lock entry to produce a result. The lower 7-bits of the result are input to logic block 1506 and the remaining bits are input to logic block 1508. Likewise, logic block 1504 converts the size 990 in the request and the size 1208 in the outstanding lock entry into mask values that are logically NORed to produce a result that is also input to logic block 1506. Illustratively, the mask values are 7-bit values determined by the following formula:

mask_value=(0x1<<size)-1 wherein mask_value is the mask value, "<<" denotes a logical left-shift operation and size is the size contained in field 990 or field 1208. Table 3, lists mask values for various size values.

TABLE 3

| Size (in bytes) | Size value | Mask Value (in binary) |
|---|---|---|
| 4 | 0 | 0000000 |
| 8 | 1 | 0000001 |
| 16 | 2 | 0000011 |
| 32 | 3 | 0000111 |
| 64 | 4 | 0001111 |
| 128 | 5 | 0011111 |
| 256 | 6 | 0111111 |
| 512 | 7 | 1111111 |

At logic block 1506, the lower 7-bits of the result from logic block 1502 are logically ANDed with the result from logic block 1504 to produce a result that is input to logic block 1508. Logic block 1508 compares the result from logic block 1506 and the upper bits from block 1502 with a predetermined value, e.g., zero. If both results are zero, logic block 1508 generates a result that indicates the memory segments overlap; otherwise, block 1508 generates a result that indicates the segments do not overlap. This result is input to block 1520. Other inputs to block 1520 include the lock operation 970 and memory operation 910 from the request, a signal indicating whether the request is associated with an entity that is the same as or different from the entity associated with the outstanding lock entry 1200, the lock type 1206 from the outstanding lock table entry 1200, and a signal indicating older pending writers associated with the outstanding lock entry. The older pending writer signal represents those requests marked as pending writers that are older than the current request. Block 1520 processes the inputs to generate an output signal that indicates (i) block the request, (ii) allow the request, (iii) mark as a pending writer and block the request, or (iv) an error condition.

Table 4 summarizes the output signal generated by block 1520 when a memory segment in the request overlaps the memory segment associated with an outstanding lock data structure entry 1200.

TABLE 4

| | | | Current Lock State | | |
|---|---|---|---|---|---|
| | | | Exclusive Writer | Shared Reader | Exclusive |
| Current Request | Same Entity | Read | Allow request | Allow request | Allow request |
| | | Write | Allow request | Error | Allow request |
| | Different Entity | Read | Allow request | Allow request if no pending writers older than this request; otherwise, block request | Block request |
| | | Write | Block request | Mark request as a pending writer and block request | Block request |

For example, assume a request currently being processed by the arbiter 1152 is associated with an entity that is different than the entity associated with an outstanding lock entry. In addition, assume the memory operation in the request indicates a read operation and the outstanding lock, associated with the outstanding lock data structure entry 1200, is a shared reader lock. In this case, the signal generated is "allow the request" if there are no blocked pending writers older than the current request; otherwise, the signal generated is "block the request."

Note that, if a request does not overlap the memory segment associated with an outstanding lock data structure entry 1200, the signal generated is "allow the request."

Figure 16A:
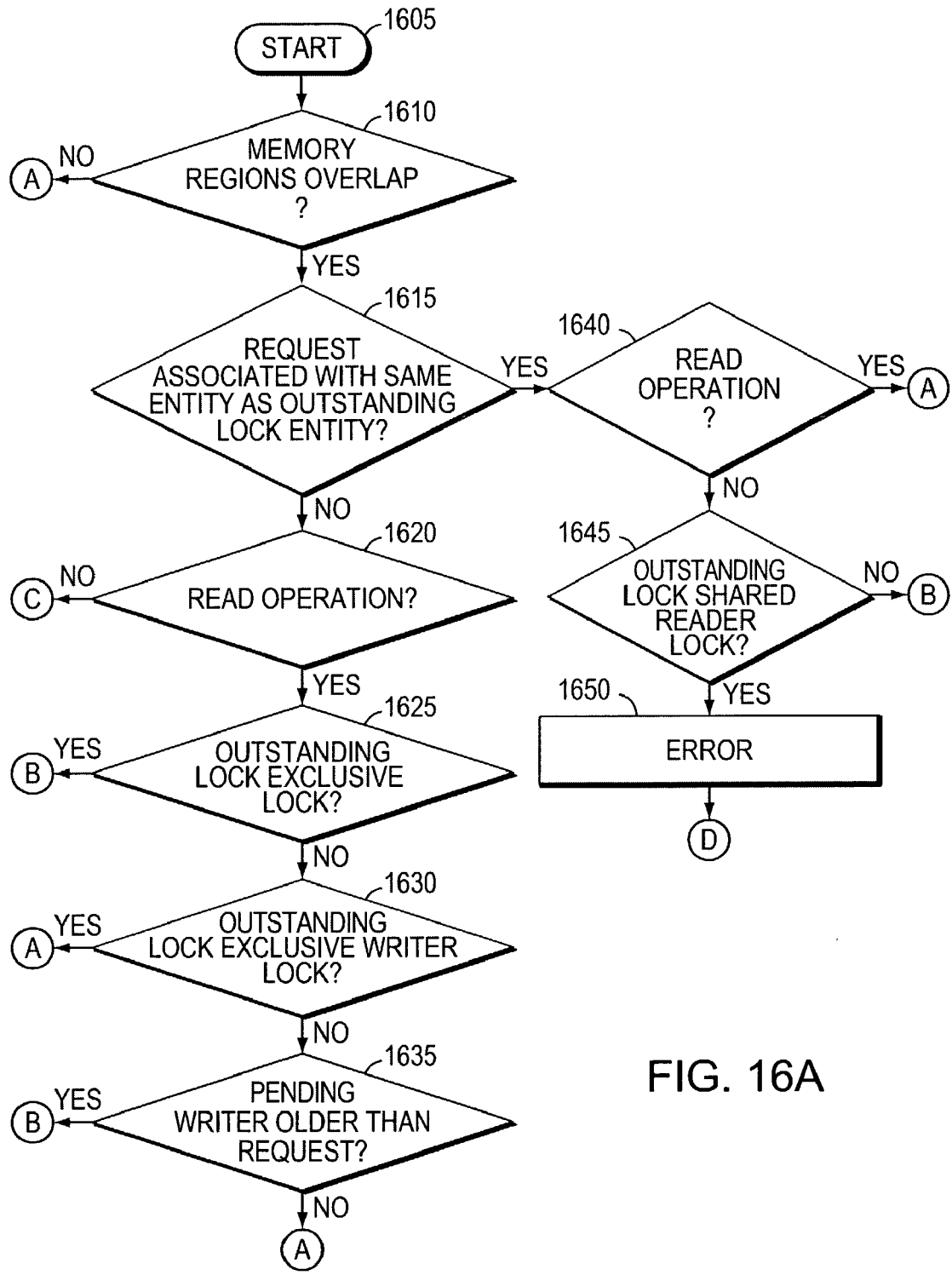
FIGS. 16A-16B are flow diagrams of a sequence of steps that may be advantageously used with the present invention to determine if a request is blocked, allowed, blocked as a pending writer, or in error.
Figure 16B:
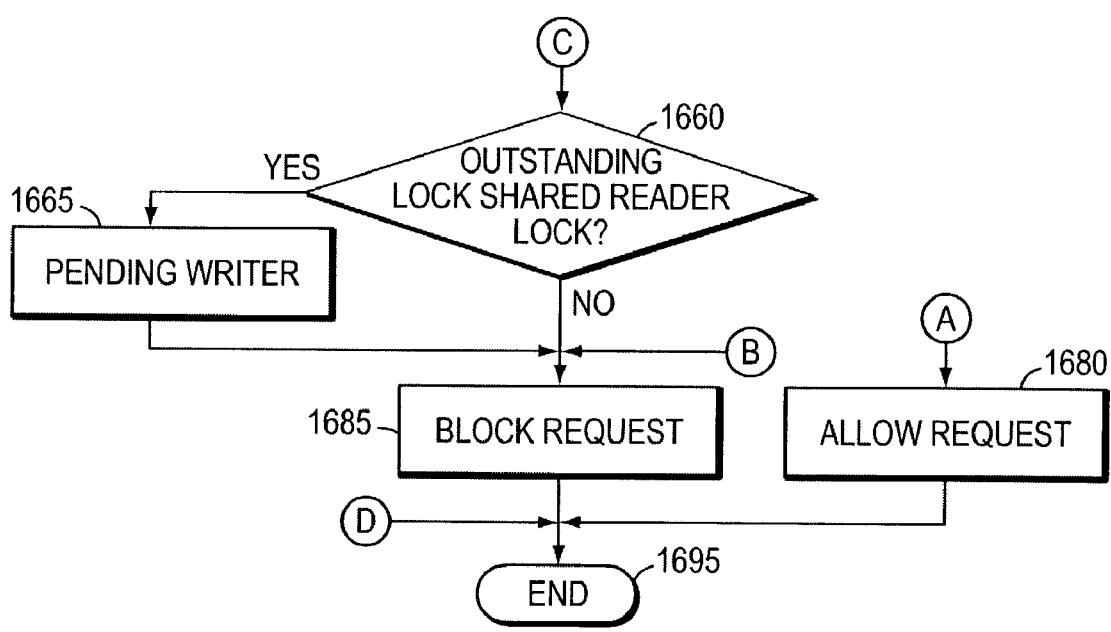

FIGS. 16A and 16B are flow diagrams illustrating a sequence of steps that can be used to apply a request 900 (current request) to an outstanding lock data structure entry to determine if the request is blocked, allowed, marked as a pending writer and blocked, or an error condition. The sequence begins at Step 1605 and proceeds to Step 1610 where a check is performed to determine if the memory segment controlled by the lock associated with the request overlaps the memory segment controlled by the outstanding lock associated with the outstanding lock entry. If not, the sequence proceeds to Step 1680 (FIG. 16B) where the request is allowed and the sequence ends at Step 1695.

Otherwise, the sequence proceeds to Step 1615 where a check is performed to determine if the request and outstanding lock entry 1200 are associated with the same entity, e.g., the same processor. If so, the sequence proceeds to Step 1640 where a check is performed to determine if the memory operation field 910 indicates a read operation. If so, the sequence proceeds to Step 1680 where the request is allowed and the sequence ends at Step 1695. If the memory operation field does not indicate a read operation, the sequence proceeds to Step 1645 where a check is performed to determine if the lock type field 1206 indicates the outstanding lock is a shared reader lock. If not, the sequence proceeds to Step 1685 where the request is blocked and the sequence ends at Step 1695. Otherwise, the sequence proceeds to Step 1650 where the request is an error condition and the sequence ends at Step 1695.

Returning to Step 1615, if the entity associated with the request is different than the entity associated with the outstanding lock entry, the sequence proceeds to Step 1620 where a check is performed to determine if the memory operation field 910 indicates a read operation. If not, the sequence proceeds to Step 1660 (FIG. 16B) where a check is performed to determine if the lock type field 1206 indicates the outstanding lock is a shared reader lock. If so, the sequence proceeds to Step 1665 where the request is marked as a pending writer and Step 1685 where the request is blocked. The sequence then ends (Step 1695). Otherwise, the sequence proceeds to Step 1685 where the request is blocked and the sequence ends at Step 1695.

Returning to Step 1620, if the memory operation field 910 does indicate a read operation, the sequence proceeds to Step 1625 where a check is performed to determine if the lock type field 1206 indicates the outstanding lock is an exclusive lock. If so, the sequence proceeds to Step 1685 where the request is blocked and the sequence ends at Step 1695. Otherwise, the sequence proceeds to Step 1630 where a check is performed to determine if the lock type field 1206 indicates the outstanding lock is an exclusive writer lock. If so, the sequence proceeds to Step 1680 where the request is allowed and the sequence ends at Step 1695.

Otherwise, at Step 1630, if the lock type field 1206 does not indicate an exclusive writer lock, the sequence proceeds to Step 1635 where a check is performed to determine if a request that is older than the current request is marked as a pending writer and blocked. If so, the sequence proceeds to Step 1685 where the current request is blocked and the sequence ends at Step 1695. Otherwise, the sequence proceeds to Step 1680 where the current request is allowed and the sequence ends at Step 1695.

Figure 17A:
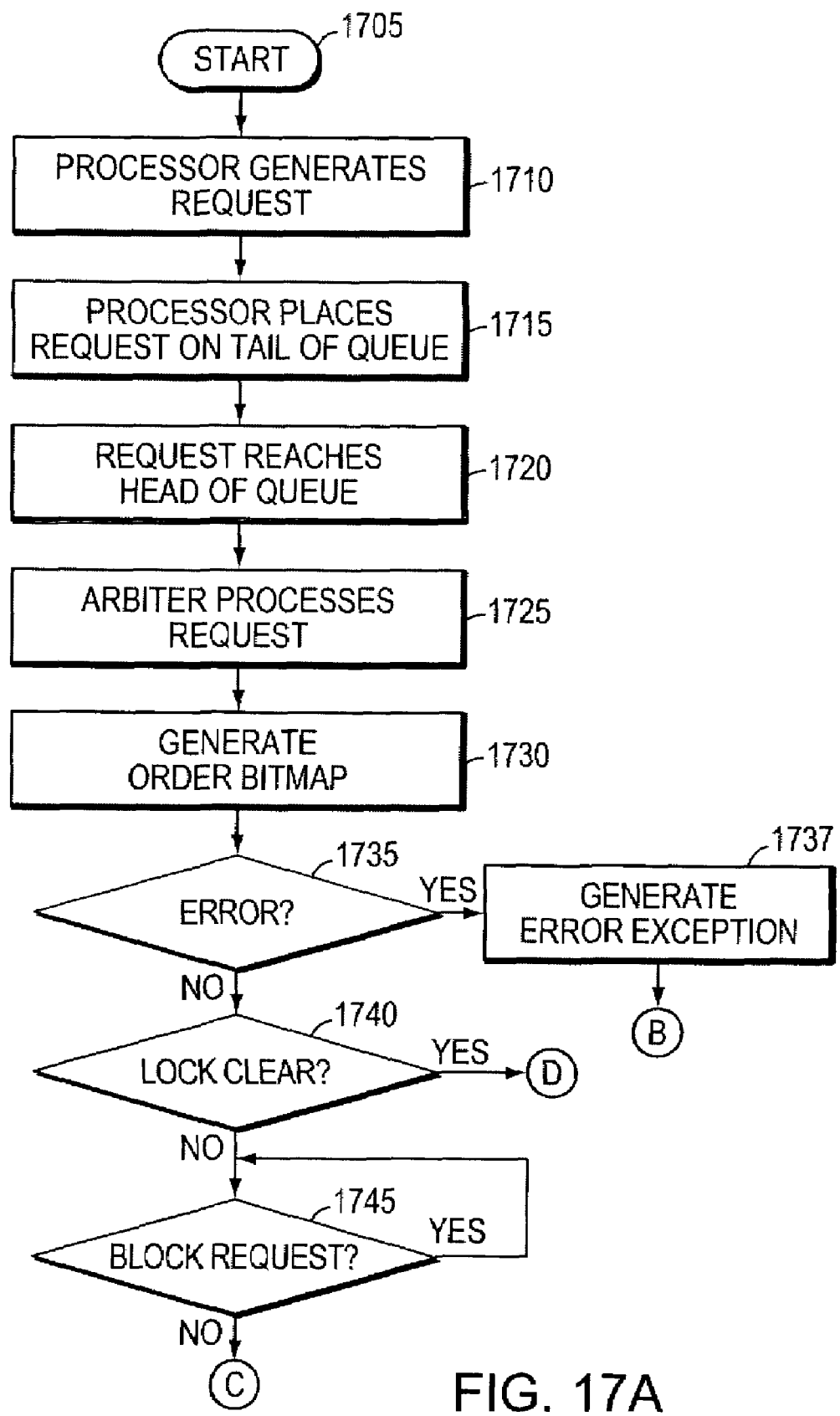
FIGS. 17A-17B are flow diagrams of a sequence of steps that can be advantageously used to implement the present invention.
Figure 17B:
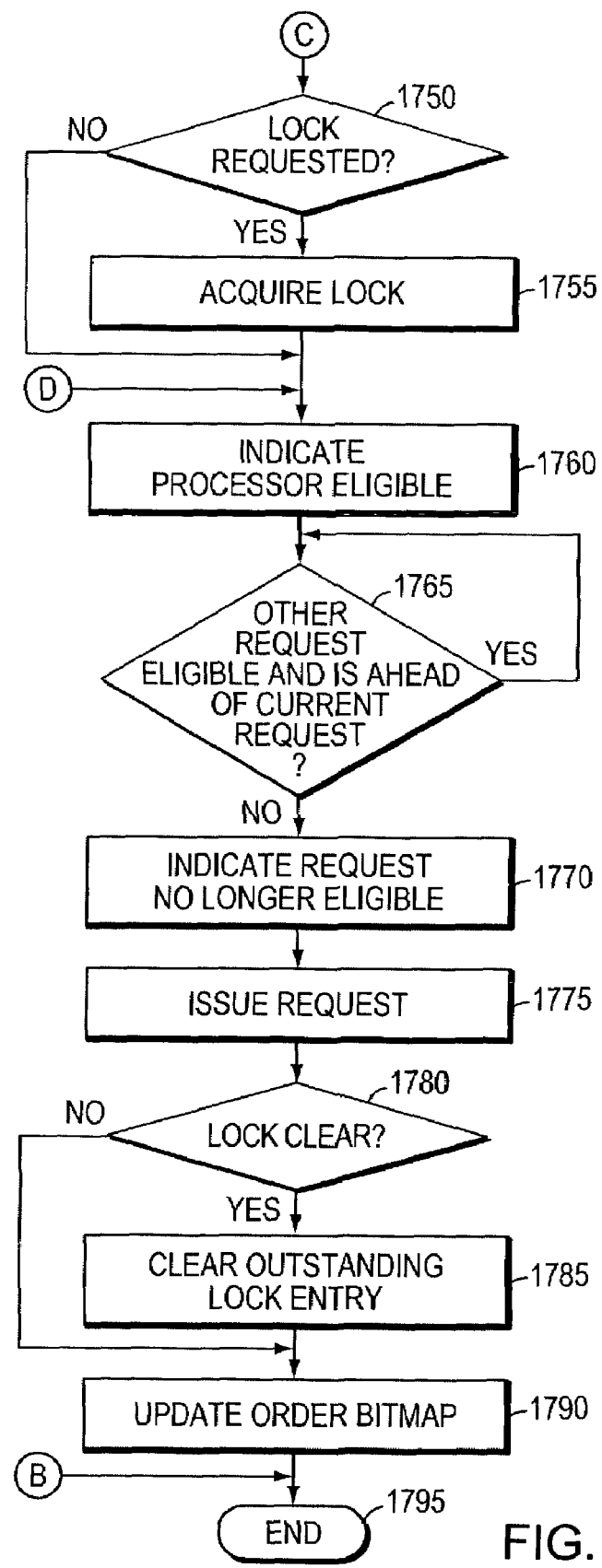

FIGS. 17A-17B are flow diagrams illustrating a sequence of steps that can be used to process an instruction involving a lock operation in accordance with the inventive technique. The sequence begins at Step 1705 and proceeds to Step 1710 where a processor, such as processor 530a, generates request 900 containing information associated with a lock. As described, this information includes a memory operation, e.g., a read or write operation, associated with an opcode of the instruction, a memory address, a lock operation and a lock size associated with the lock. At Step 1715, processor 530a places the generated request on a request queue, such as queue 1155a, associated with processor 530a.

At Step 1720, request 900 reaches the head of the request queue. The arbiter 1152a sees the request 900 and processes it including generating an order bitmap 1300 (Steps 1725-1730). The sequence proceeds to Step 1735, where a check is performed, in a manner as described above, to determine if the request is an error condition. If so, the sequence proceeds to Step 1737 where exception handler 485 (FIG. 4) generates and reports an exception condition to the processors 530 and the sequence ends at Step 1795 (FIG. 17B). Otherwise, at Step 1740, the arbiter 1152a determines if the lock operation 970 specified in the request 900 is a lock clear operation. If so, the sequence proceeds to Step 1760 (FIG. 17B). If the operation 970 is not a lock clear operation, the sequence proceeds to Step 1745 where the processor determines, in a manner as described above, if the request 900 is blocked by any lock. If so, the sequence returns to Step 1745. Otherwise, the sequence proceeds to Step 1750 (FIG. 17B) where a check is performed to determine if the request's lock request 950 and lock operation 970 fields indicate a lock is requested. If not, the sequence proceeds to Step 1760. Otherwise, the sequence proceeds to Step 1755 where the lock is acquired by, e.g., generating a lock type based on the contents of the lock operation 970 field, placing the generated lock type and the contents of the lock size 990 and memory address 930 fields in the lock type 1206, size 1208, and is address 1204 fields of the processor's outstanding lock entry, respectively, and setting the valid field 1202 to indicate the entry 1200 is valid, i.e., the lock is active. Next, at Step 1760, the arbiter 1152a indicates in the eligible bitmap 1400 that the request 900 is eligible to be issued to the external memory 380, illustratively by setting the bit 1402 associated with the request's request queue.

At Step 1765, the memory controller 475a determines if there is another request associated with another queue 1155 that is both eligible and ahead of the request 900. This determination is illustratively made by logically ANDing the order bitmap 1300 of the queue 1155 associated with the request 900 with the eligible bitmap 1400 and checking the result for zero. If the result is non-zero, meaning one or more other eligible requests are ahead of the request 900, the sequence returns to Step 1765. Otherwise, the sequence proceeds to Step 1770 where the arbiter 1152a indicates in the eligible bitmap 1400 that the request 900 is no longer eligible, illustratively by clearing the bit 1402 associated with the request's queue.

At Step 1775, the memory controller 475a issues the request 900 to the external memory 380. A determination is then made at Step 1780 as to whether a lock clear operation is specified in the request 900. If so, the sequence proceeds to Step 1785 where the arbiter clears the outstanding lock entry 1200 of the entity associated with the request 900. For example, instruction 618 (FIG. 6) releases the memory lock that was acquired when instruction 614 was executed. When processor 530a executes instruction 618, it generates a request 900 that specifies a lock clear operation. Since this request is associated with processor 530a, at Step 1785, arbiter 1152a clears the outstanding lock table entry 1200 associated with processor 530a. An outstanding lock table entry 1200 is illustratively cleared by setting the valid field 1202 to indicate the entry is invalid, i.e., the lock is inactive. At step 1790, the arbiter 1152 updates the order bitmap by, e.g., clearing the bit 1302 associated with the request's request queue in each of the order bitmaps 1300. The sequence ends at Step 1795.

It should be noted that in accordance with the inventive technique, although a request is blocked due to an outstanding lock, e.g., an outstanding exclusive, exclusive-write, or shared-reader lock, the entity that issued the request can continue to perform other instructions unrelated to the results of the blocked request.

Also, it should be noted that in the above-described embodiment of the invention the request contains a lock size value that represents the size of the memory segment associated with the lock. However, this is not intended to be a limitation of the invention. Rather in other embodiments of the invention, the request does not specify or contain a lock size. For example, in one embodiment, the lock size is fixed and therefore the size need not be specified. In other embodiments, the resource controlled by the lock does not have a size attribute and therefore the size need not be specified, as well.

Although the above-described embodiment of the invention utilizes instructions that specify the lock's attributes by specifying a register containing the lock's attributes, e.g., "LD.M0," this is not intended to be a limitation of the invention. In other embodiments of the invention, the lock's attributes are specified by including the attributes in the instruction. For example, in one embodiment of the invention a "lock instruction" is used to access a lock. The instruction contains the attribute and resource information associated with the lock. The attribute information includes a lock operation value, and optionally a lock size value and the resource information includes a memory address value. The lock operation value specifies an operation that is used to access the lock. The memory address value specifies a memory address associated with the lock and the lock size value specifies the size of the memory segment controlled by the lock. A memory request used to access the lock, in a manner as described above, is generated using the lock attribute and resource information contained in the instruction. Specifically, the instruction is decoded in a manner as described above except that the lock operation, memory address, and lock size values contained in the instruction are used to generate the lock operation, memory address, and lock size values contained in the request, respectively.

As noted above, entities other than a processor, such as a thread, can take advantage of the invention. For example, in one embodiment of the invention a single processor supporting multiple threads of execution employs the above-described technique to manage locks utilized by the threads. In this embodiment, the threads acquire and release locks by issuing requests in a manner as described above. Likewise, each outstanding lock data structure entry is associated with a particular thread.

In the above-described embodiment of the invention, the outstanding lock data structure contains one entry for each entity, e.g., a processor, or a thread; however, this too is not intended to be a limitation of the invention. In other embodiments of the invention, the outstanding lock data structure is configured to enable an entity to have more than one outstanding lock entry. For example, in one embodiment of the invention, the outstanding lock entry contains a field that designates the processor associated with the entry. In this embodiment, if a request specifies a lock clear operation, the outstanding lock data structure entry that is cleared is determined by matching the memory address specified in the request with the memory region associated with the outstanding lock data structure entry.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for accessing a lock associated with a resource in a computer system, the method comprising the steps of:

generating, at a particular entity, a request comprising attribute and resource information associated with the lock, the attribute information denoting a type of lock operation;

enqueuing the request on a request queue that is associated with the particular entity at resource controller, the request queue associated with the particular entity being one of a plurality of request queues at the resource controller;

enqueuing at least one second request on a second request queue of the plurality of request queues at the resource controller, the second request associated with a second entity;

tracking the order in which requests reach the head of the request queue that is associated with the particular entity and the second request queue that is associated with the second entity;

when the request reaches the head of the request queue that is associated with the particular entity, applying, by a resource controller, the attribute and resource information to an outstanding lock data structure to determine if the request is allowed; and if the request is allowed, performing a lock operation contained in the information; and if the request is blocked, holding the request in the request queue associated with the particular entity at the resource controller, and subsequently selecting the request to be executed in response to the request being the oldest request in any of the plurality of request queues that is becoming allowed.

2. A method as defined in claim 1 wherein the resource is a memory.

3. A method as defined in claim 1 wherein the information comprises a memory address.

4. A method as defined in claim 3 wherein the information comprises a lock size.

5. A method as defined in claim 4 wherein the step of generating comprises the steps of:

selecting a memory lock register containing a lock operation value and a lock size value; and generating the lock operation and the lock size contained in the request from the lock operation value and the lock size value contained in the memory lock register, respectively.

6. A method as defined in claim 3 wherein the step of generating comprises the steps of:

decoding an instruction wherein the instruction specifies a memory address value and a lock operation value;

generating the memory address and the lock operation contained in the request from the memory address value and the lock operation value specified by the instruction, respectively.

7. A method as defined in claim 6 wherein the memory address value and lock operation value are contained in the instruction.

8. A method as defined in claim 6 comprising the step of:
generating a memory operation contained in the request from an operation code (opcode) contained in the instruction.

9. A method as defined in claim 1 wherein the outstanding lock data structure is a table comprising one or more outstanding lock data structure entries.

10. A method as defined in claim 1 wherein the entity is a processor.

11. A method as defined in claim 1 wherein the entity is a thread.

12. A method as defined in claim 9 wherein each outstanding lock data structure entry comprises a lock address, a lock type, and a lock segment size.

13. A method for accessing a lock associated with a resource in a computer system, the method comprising the steps of:
  generating, at a particular entity, a request comprising attribute and resource information associated with the lock;
  enqueuing the request on a request queue that is associated with the particular entity, the request queue associated with the particular entity being one of a plurality of request queues;
  enqueuing at least one second request on a second request queue of the plurality of request queues, the second request associated with a second entity;
  tracking the order in which requests reach the head of the request queue that is associated with the particular entity and the second request queue that is associated with the second entity;
  applying the attribute and resource information to an outstanding lock data structure to determine if the request is allowed, wherein the outstanding lock data structure is a table comprising one or more outstanding lock data structure entries;
  determining if a first entity associated with the request is the same entity as a second entity associated with an outstanding lock data structure entry;
  if so, determining if a memory operation contained in the request indicates a write operation;
  if so, determining if a lock type contained in the outstanding lock data structure entry indicates a shared reader lock;
  if not, concluding the request is allowed; and
  if the request is allowed, performing a lock operation contained in the information, and if the request is blocked, holding the request in a request queue that is associated with the particular entity at a resource controller, the request queue associated with the particular entity being one of a plurality of request queues, and subsequently, selecting the request to be executed in response to the request being the oldest request in any of the plurality of request queues that is becoming allowed.

14. A method for accessing a lock associated with a resource in a computer system, the method comprising the steps of:
  generating, at a particular entity, a request comprising attribute and resource information associated with the lock;
  enqueuing the request on a request queue that is associated with the particular entity, the request queue associated with the particular entity being one of a plurality of request queues;
  enqueuing at least one second request on a second request queue of the plurality of request queues, the second request associated with a second entity;
  tracking the order in which requests reach the head of the request queue that is associated with the particular entity and the second request queue that is associated with the second entity;
  applying the attribute and resource information to an outstanding lock data structure to determine if the request is allowed, wherein the outstanding lock data structure is a table comprising one or more outstanding lock data structure entries;
  determining if a first entity associated with the request is the same entity as a second entity associated with an outstanding lock data structure entry;
  if not, determining if a memory operation contained in the request indicates a read operation;
  if so, determining if a lock type contained in the outstanding lock data structure entry indicates an exclusive writer lock;
  if so, concluding the request is allowed; and
  if the request is allowed, performing a lock operation contained in the information, and if the request is blocked, holding the request in a request queue that is associated with the particular entity at a resource controller, the request queue associated with the particular entity being one of a plurality of request queues, and subsequently, selecting the request to be executed in response to the request being the oldest request in any of the plurality of request queues that is becoming allowed.

15. A method for accessing a lock associated with a resource in a computer system, the method comprising the steps of:
  generating, at a particular entity, a request comprising attribute and resource information associated with the lock;
  enqueuing the request on a request queue that is associated with the particular entity, the request queue associated with the particular entity being one of a plurality of request queues;
  enqueuing at least one second request on a second request queue of the plurality of request queues, the second request associated with a second entity;
  tracking the order in which requests reach the head of the request queue that is associated with the particular entity and the second request queue that is associated with the second entity;
  applying the attribute and resource information to an outstanding lock data structure to determine if the request is allowed, wherein the outstanding lock data structure is a table comprising one or more outstanding lock data structure entries;
  determining if a first entity associated with the request is the same entity as a second entity associated with an outstanding lock data structure entry;
  if not, determining if a memory operation contained in the request indicates a read operation;

if so, determining if a lock type contained in the outstanding lock data structure entry indicates a shared reader lock;

if so, determining if a second request is an older pending writer;

if not, concluding the request is allowed; and if the request is allowed, performing a lock operation contained in the information, and if the request is blocked, holding the request in a request queue that is associated with the particular entity at a resource controller, the request queue associated with the particular entity being one of a plurality of request queues, and subsequently, selecting the request to be executed in response to the request being the oldest request in any of the plurality of request queues that is becoming allowed.

16. A system adapted to access a lock associated with a resource in a computer system, the system comprising:

a processor configured to generate a request comprising attribute and lock information associated with the lock, the attribute information denoting a type of lock operation;

a resource controller coupled to the processor and configured to enqueue the request on a request queue that is associated with the processor, the request queue associated with the processor being one of a plurality of request queues, the plurality of request queues including at least one second request queue associated with a second processor;

an order bitmap configured to track the order in which requests reach the head of the request queue associated with the processor and the head of the second request queue associated with the second processor; and the resource controller further configured to, when the request reaches the head of the request queue associated with the processor, apply the attribute and lock information to an outstanding lock data structure to determine if the request is allowed and if so, perform a lock operation contained in the information, and if the request is blocked, hold the request in the request queue associated with the processor and select the request to be executed in response to the request being the oldest request in the plurality of request queues that is becoming allowed.

17. A system as defined in claim 16 comprising:

an order bitmap configured to track the order in which the request was seen by the resource controller.

18. A system as defined in claim 16 wherein the resource controller is a memory controller.

19. A system as defined in claim 18 comprising:

a memory coupled to the memory controller.

20. A system as defined in claim 19 comprising:

an eligible bitmap configured to indicate requests that are eligible to be issued to the memory.

21. A computer readable medium containing computer executable instructions for accessing a lock associated with a resource in a computer system, the executable program instructions comprising computer executable instructions for:

generating, at a particular entity, a request comprising attribute and resource information associated with the lock, the attribute information denoting a type of lock operation;

enqueuing the request on a request queue that is associated with the particular entity;

enqueuing at least one second request on a second request queue, the second request associated with a second entity;

tracking the order in which requests reach the head of the request queue that is associated with the particular entity and the second request queue that is associated with the second entity;

applying, by a resource controller, the attribute and resource information to an outstanding lock data structure to determine if the request is allowed;

performing a lock operation contained in the information if the request is allowed; and if the request is blocked, holding the request in the request queue that is associated with the particular entity at a resource controller and subsequently, selecting the request to be executed in response to the request being the oldest request in any request queue that is becoming allowed.

22. The method as defined in claim 1 wherein the lock operation is selected from the group consisting of: a lock clear operation, a get exclusive lock operation, a get shared-reader lock operation, and a get exclusive-writer lock operation.

23. The method as defined in claim 1 wherein the attribute information is associated with a type of lock selected from the group consisting of: an exclusive lock, a shared-reader lock, and an exclusive-writer lock.

24. The method as defined in claim 1 wherein the computer system is a programmable processing engine of a router.

25. The method as defined in claim 4 wherein the lock size specifies one of a plurality of different sizes of memory segment that may be locked, the memory segment to include the memory address associated with the lock request.

26. An apparatus comprising:

a processor configured to generate a request including a lock address, a lock operation and a lock size, the lock operation including one of a get exclusive lock operation, a get shared-reader lock operation, or a get exclusive-writer lock operation, the lock size to indicate a size of a memory segment associated with the request;

an outstanding lock data structure configured to hold entries descriptive of active locks, the entries each including a lock address of an active lock, a lock type of the active lock, and a lock segment size of the active lock, the lock type including one of an exclusive lock, a shared-reader lock, or an exclusive-writer lock;

at least one request queue associated with the processor and configured to store the request;

at least one second request queue associated with a second processor;

an order bitmap configured to track the order in which requests reach the head of the at least one request queue associated with the processor and the head of the at least one second request queue associated with the second processor;

a resource controller coupled to the processor and configured to, upon the request reaching the head of the at least one request queue associated with the processor, apply the lock address, the lock operation, and the lock size of the request to each of the entries in the outstanding lock data structure, the resource controller to determine in response thereto if the lock address and the lock operation of the request indicate a memory segment that overlaps that of one of the entries in the outstanding lock data structure, and, if there is overlap, to determine whether the lock operation of the request conflicts with the lock type of that entry in the outstanding lock data structure, and, if there is conflict, to block the request, and if there is no conflict, to allow the request.

27. The apparatus of claim 26, wherein the request further includes a memory operation to be performed at an address in the memory segment associated with the request.

28. The apparatus of claim 26, wherein the resource controller is further configured to determine if there is conflict based in part upon whether each active lock was generated by the processor, or by a different processor.

29. The apparatus of claim 26, wherein the order bitmap is further configured to track any requests that have been previously blocked and held in the request queue or in the second request queue, and wherein the resource controller is further configured give preference to any requests that have been previously blocked over requests that have not been previously blocked.

30. A method comprising:
   generating a request including a lock address, a lock operation, and a lock size, the lock operation including one of a get exclusive lock operation, a get shared-reader lock operation, or a get exclusive-writer lock operation, the lock size to indicate a size of a memory segment associated with the request;
   storing entries descriptive of active locks in a data structure, the entries each including a lock address of an active lock, a lock type of the active lock, and a lock segment size of the active lock, the lock type including one of an exclusive lock, a shared-reader lock, or an exclusive-writer lock;
   queuing the request in at least one request queue associated with a processor;
   queuing at least one second request in at least one second request queue associated with a second processor;
   tracking the order in which requests reach the head of the at least one request queue associated with the processor and the head of the at least one second request queue associated with the second processor;
   upon the request reaching the head of the at least one request queue associated with the processor, applying the lock address, the lock operation, and the lock size of the request to each of the entries in the outstanding lock data structure;
   determining if the lock address and the lock operation of the request indicate a memory segment that overlaps that of one of the entries in the outstanding lock data structure;
   if there is overlap, determining whether the lock operation of the request conflicts with the lock type of that entry in the outstanding lock data structure, by comparing the lock operation in the request with the lock type of that entry;
   if there is conflict, blocking the request;
   if there is no conflict, allowing the request.

31. The method of claim 30, wherein the request further includes a memory operation to be performed at an address in the memory segment associated with the request, and the step of allowing further comprises:
   performing the memory operation.

32. The method of claim 30, wherein the step of generating is performed by a processor and the method further comprises:
   determining if there is conflict based in part upon whether each active lock was generated by the processor or by a different processor.

33. The method of claim 30, further comprising:
   tracking any requests that have been previously blocked and held in the request queue or the second request queue and giving preference to any requests that have been previously blocked over requests that have not been previously blocked.

* * * * *